United States Patent
Agrawal et al.

(10) Patent No.: US 11,579,576 B2
(45) Date of Patent: Feb. 14, 2023

(54) SYSTEMS AND METHODS FOR OPTIMIZING PERFORMANCE PARAMETERS OF AIR HANDLING UNITS IN INFRASTRUCTURES

(71) Applicant: Tata Consultancy Services Limited, Mumbai (IN)

(72) Inventors: Supriya Agrawal, Pune (IN); Sagar Verma, Pune (IN); Ramasubramanian Suriyanarayanan, Chennai (IN); Srinarayana Nagarathinam, Chennai (IN); Rajesh Jayaprakash, Chennai (IN); Venkatesh Ramanathan, Pune (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 457 days.

(21) Appl. No.: 16/775,089

(22) Filed: Jan. 28, 2020

(65) Prior Publication Data
US 2020/0249645 A1    Aug. 6, 2020

(30) Foreign Application Priority Data
Jan. 31, 2019  (IN) .............................. 201921003884

(51) Int. Cl.
*G05B 19/042* (2006.01)
*G06N 5/02* (2023.01)

(52) U.S. Cl.
CPC ............ *G05B 19/042* (2013.01); *G06N 5/027* (2013.01); *G05B 2219/2614* (2013.01)

(58) Field of Classification Search
CPC .......... G05B 19/042; G05B 2219/2614; G05B 2219/2642; G05B 15/02; G06N 5/027
See application file for complete search history.

(56) References Cited

U.S. PATENT DOCUMENTS

2005/0246686 A1  11/2005  Seshadri et al.
2012/0271462 A1  10/2012  Dempster et al.
2013/0035799 A1   2/2013  Song et al.
2018/0372356 A1* 12/2018  Endel ................. G05B 23/0278

FOREIGN PATENT DOCUMENTS

EP           3282404          2/2018

\* cited by examiner

*Primary Examiner* — Michael W Choi
(74) *Attorney, Agent, or Firm* — Finnegan, Henderson, Farabow, Garrett & Dunner, LLP

(57) ABSTRACT

Sub-systems of air handling units in infrastructures face unresolved problem of conflict in the rules that activate in a contradictory manner at the same time resulting in sub-optimal performance of the subsystems. The present disclosure provides a system and method for optimizing performance parameters of air handling units in infrastructures. Rule sets having conflicting conditions are identified after verification of rules which are specific to air handling units. Further, frequency of the rule sets having conflicting conditions is determined to generate a ranked list of the rule sets having conflicting conditions. Another ranking procedure is implemented for the rules comprised in the ranked list of the rule sets having conflicting conditions. The system dynamically optimizes one or more parameters specific to the performance criteria based on the ranking of rules.

6 Claims, 4 Drawing Sheets

SYSTEMS AND METHODS FOR OPTIMIZING PERFORMANCE PARAMETERS OF AIR HANDLING UNITS IN INFRASTRUCTURES

PRIORITY CLAIM

This U.S. patent application claims priority under 35 U.S.C. § 119 to: India Application No. 201921003884, filed on Jan. 31, 2019. The entire contents of the aforementioned application are incorporated herein by reference.

TECHNICAL FIELD

The disclosure herein generally relates to Air Handling Units (AHUs) in infrastructures, and, more particularly, to systems and methods for optimizing performance parameters of AHUs in infrastructures.

BACKGROUND

Air handling units (AHUs) are integral part of infrastructure ecosystem which provide an intelligent mechanism for keeping building ambient/condition(s) within a specified range based on an occupancy schedule, monitoring performance and device failures in all systems and providing malfunction alarms. During peak usage times, reduction in building energy helps in reducing the energy costs of operating a building's heating, ventilation, and air conditioning (HVAC), lighting, elevator, and other subsystems. Mostly, Air handling units include a control layer as a supervisory layer that manages multiple underlying sub-systems such as HVAC sub-systems and access control sub-systems. Implementation of logic and intelligence behind supervisory control layer is expressed in the form of a sequence of 'if then' rules, which leverage data from multiple systems for implementation.

These rules are mostly given by operators. The operators, despite of having operational knowledge and an intuitive or heuristic understanding of the system behavior, may not be expert in the respective domains. Further, there can be possibilities of conflict in the rules (two rules that activate the devices in a contradictory manner at the same time) as the rules may be provided by multiple stakeholders. Hence, there may be possibility of constraints violation with respect to the occupants' comfort and adverse effect on the equipment due to too-frequent duty cycling or adjustment of the devices.

SUMMARY

Embodiments of the present disclosure present technological improvements as solutions to one or more of the above-mentioned technical problems recognized by the inventors in conventional systems. For example, in one embodiment, there is provided a processor implemented method, comprising receiving, via one or more hardware processors, a plurality of rules comprising one or more static and dynamic variables of one or more operations of at least one subsystem; verifying, using a test case generation framework, the received plurality of rules comprising one or more static and dynamic variables of the one or more operations to identify one or more rule sets having conflicting conditions; determining, using an integrated framework, frequency of the one or more rule sets having conflicting conditions; generating, based on the frequency of the one or more rule sets having conflicting conditions, a ranked list of the one or more rule sets having conflicting conditions; identifying, one or more rules based on a selection of at least one rule set from the ranked list of the one or more rule sets and a performance criteria. In an embodiment, the selection of at least one rule set from the ranked list of the one or more rule sets is based on a highest conflict frequency criteria. In an embodiment, the method further comprises dynamically optimizing, one or more parameters specific to the performance criteria based on at least one of (i) the identified one or more rules. In an embodiment, the one or more parameters specific to the performance criteria comprises at least one of (i) a consumed energy and (ii) a discomfort level.

In another embodiment, there is provided a system comprising: a memory storing instructions; one or more communication interfaces; and one or more hardware processors coupled to the memory through the one or more communication interfaces, wherein the one or more hardware processors are configured by the instructions to receive, a plurality of rules comprising one or more static and dynamic variables of one or more operations of at least one subsystem; verify, using a test case generation framework, the received plurality of rules comprising one or more static and dynamic variables of the one or more operations to identify one or more rule sets having conflicting conditions; determine, using an integrated framework, frequency of the one or more rule sets having conflicting conditions; generate, based on the frequency of the one or more rule sets having conflicting conditions, a ranked list of the one or more rule sets having conflicting conditions; identify, one or more rules based on a selection of at least one rule set from the ranked list of the one or more rule sets and a performance criteria. In an embodiment, the selection of at least one rule set from the ranked list of the one or more rule sets is based on a highest conflict frequency criteria. In an embodiment, the one or more hardware processors are further configured by the instructions to dynamically optimize, one or more parameters specific to the performance criteria based on at least one of (i) the identified one or more rules. In an embodiment, the one or more parameters specific to the performance criteria comprises at least one of (i) consumed energy and (ii) discomfort level.

In yet another embodiment, there are provided one or more non-transitory machine readable information storage mediums comprising one or more instructions which when executed by one or more hardware processors cause receiving, via one or more hardware processors, a plurality of rules comprising one or more static and dynamic variables of one or more operations of at least one subsystem; verifying, using a test case generation framework, the received plurality of rules comprising one or more static and dynamic variables of the one or more operations to identify one or more rule sets having conflicting conditions; determining, using an integrated framework, frequency of the one or more rule sets having conflicting conditions; generating, based on the frequency of the one or more rule sets having conflicting conditions, a ranked list of the one or more rule sets having conflicting conditions; identifying, one or more rules based on a selection of at least one rule set from the ranked list of the one or more rule sets and a performance criteria. In an embodiment, the selection of at least one rule set from the ranked list of the one or more rule sets is based on a highest conflict frequency criteria. In an embodiment, the instructions may further cause dynamically optimizing, one or more parameters specific to the performance criteria based on at least one of (i) the identified one or more rules. In an embodiment, the one or more parameters specific to the performance criteria comprises at least one of (i) a consumed energy and (ii) a discomfort level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
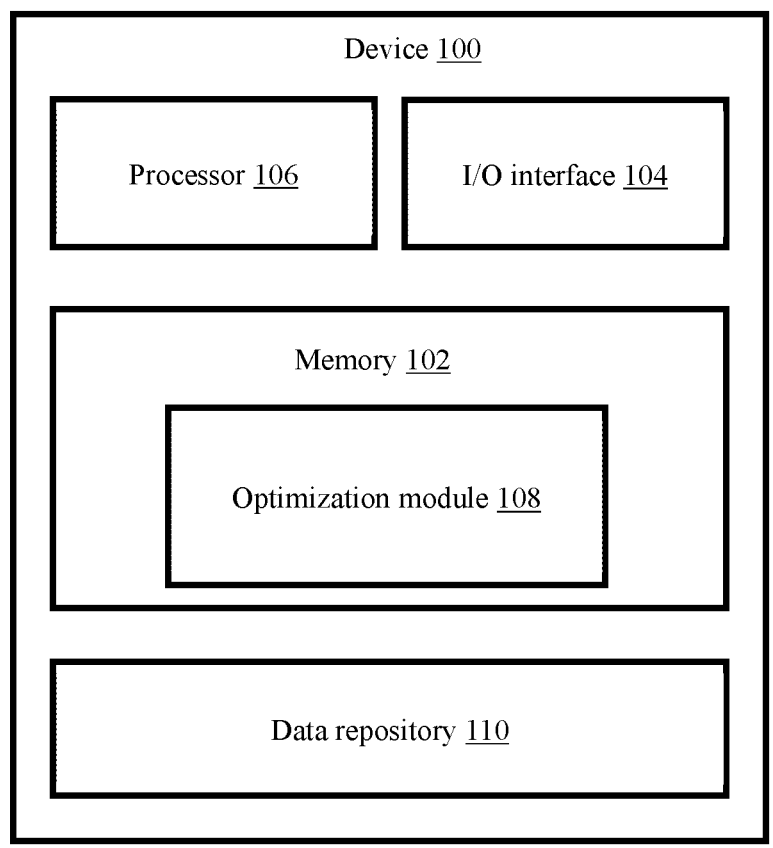
FIG. 1 illustrates a functional block diagram of a system for optimizing performance parameters of Air Handling Units (AHUs) in infrastructures, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide systems and methods for optimizing performance parameters of Air Handling Units in infrastructures. The typical interpretation of results obtained from conventional building automation systems has been modified to solve a problem of building energy reduction where a formal specification based verification of automation rules is performed followed by a rules prioritization mechanism for optimizing parameters affecting performance of AHUs. The rules prioritization mechanism is performed based on ranking of a plurality of rule sets having conflicting conditions and ranking of rules comprised in the ranked rule sets having conflicting conditions. The ranking of rule sets having conflicting conditions is performed based on their frequency. Further, based on rule prioritization, one or more parameters specific to the performance criteria such as consumed energy and discomfort level, and the like are dynamically optimized.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates a functional block diagram of a system for optimizing performance parameters of air handling units in infrastructures, according to some embodiments of the present disclosure. The system 100 includes or is otherwise in communication with one or more hardware processors such as a processor 106, an I/O interface 104, at least one memory such as a memory 102, and an optimization module 108. In an embodiment, the optimization 108 can be implemented as a standalone unit in the system 100. In another embodiment, the optimization module 108 can be implemented as a module in the memory 102. The processor 106, the I/O interface 104, and the memory 102, may be coupled by a system bus.

The I/O interface 104 may include a variety of software and hardware interfaces, for example, a web interface, a graphical user interface, and the like. The interfaces 104 may include a variety of software and hardware interfaces, for example, interfaces for peripheral device(s), such as a keyboard, a mouse, an external memory, a camera device, and a printer. The interfaces 104 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 104 may include one or more ports for connecting a number of computing systems with one another or to another server computer. The I/O interface 104 may include one or more ports for connecting a number of devices to one another or to another server.

The hardware processor 106 may be implemented as one or more microprocessors, microcomputers, microcontrollers, digital signal processors, central processing units, state machines, logic circuitries, and/or any devices that manipulate signals based on operational instructions. Among other capabilities, the hardware processor 106 is configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes an optimization module 108 and a repository 110 for storing data processed, received, and generated by the optimization module 108. The optimization module 108 may include routines, programs, objects, components, data structures, and so on, which perform particular tasks or implement particular abstract data types.

The data repository 110, amongst other things, includes a system database and other data. The other data may include data generated as a result of the execution of one or more modules in the optimization module 108. The system database stores one or more static and dynamic variables including input and output variables, and performance parameters which are generated as a result of the execution of one or more modules in the optimization module 108. The data stored in system database can be learnt to further provide increased number of intelligent rules.

In an embodiment, the optimization module 108 can be configured to optimize performance parameters of air handling units in infrastructures. Optimizing performance parameters of air handling units in infrastructures can be carried out by using methodology, described in conjunction with FIG. 2 and use case examples.

Figure 2:
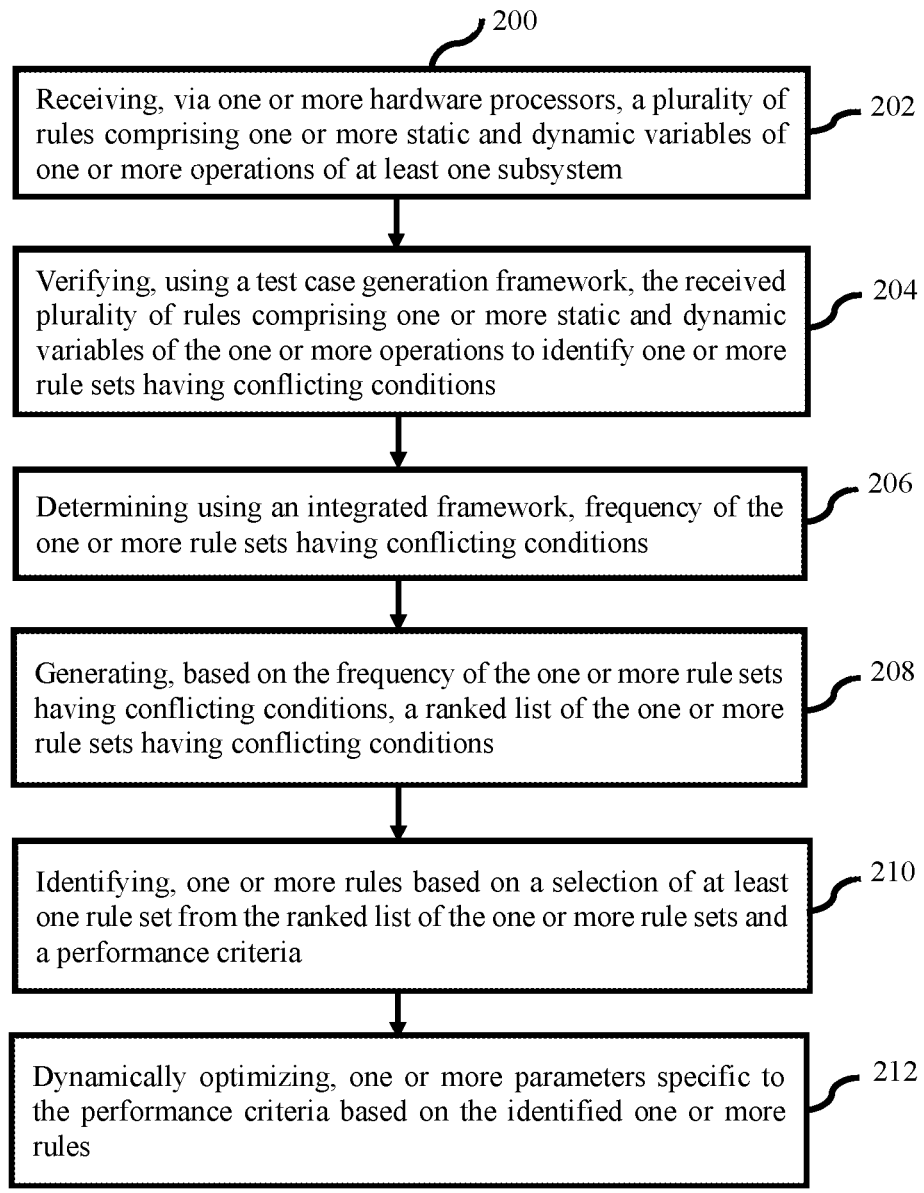
FIG. 2 is an exemplary flow diagram of a processor implemented method for optimizing performance parameters of the AHUs in infrastructures, in accordance with some embodiments of the present disclosure.

FIG. 2, with reference to FIG. 1, is an exemplary flow diagram of a processor implemented method for optimizing performance parameters of air handling units in infrastructures, using the optimization module 108 of FIG. 1, in accordance with some embodiments of the present disclosure. In an embodiment of the present disclosure, at step 202, the one or more hardware processors 106 receive, a plurality of rules comprising one or more static and dynamic variables of one or more operations of at least one subsystem. In an embodiment, the at least one subsystem may include but not limited to Heating, Ventilation, and Air-Conditioning (HVAC) sub-systems and a set of access control sub-systems. Here, the plurality of rules refer to an intelligence typically implemented in the form of logic expressed as a sequence of 'if-then' rules, which leverage data from multiple systems (e.g., temperature/humidity data from HVAC systems, occupancy data from access control systems) for optimizing their performance in an establishment. The performance (of the AHUs/HVAC systems), can be optimized by using the plurality of rules, by meeting comfort, efficiency and environment-related goals of the establishment. In an embodiment, the one or more static variables of one or more operations includes occupancy count, ambient temperature of the establishment, a return air temperature and a flow rate of an AHU fan of the establishment. The one or more dynamic variables of the one or more operations includes a discomfort level of the occupants and consumed energy of the establishment which is exceeding a predefined baseline value at the close of a business day. In an embodiment, the discomfort level of the occupants is measured in terms of the thermal comfort of the occupants.

Referring table 1, illustrating a subset of typical rules written to control the flow rate of the air handling unit of an HVAC sub-system. The rules are scheduled to run at periodic intervals and depending on whether the conditions mentioned are met, and it will change the flow rate of the AHU fan accordingly.

TABLE 1

| Rule | Intent |
| --- | --- |
| Rule 1: IF occupancyCount > 0 and ambientTemp > returnAirTemp THEN flowRate = MAX | Adjusting temperature inside the space with regards to the temperature difference between the ambient and set temperature, is set temp greater or lesser than the ambient temperature |
| Rule 2: IF occupancyCount > 0 and returnAirTemp > SetPoint THEN flowRate = MAX | If current temperature is greater than the set temp, increase FAN Speed |
| Rule 3: IF occupancyCount > 0 and returnAirTemp < SetPoint THEN flowRate = MAX/4 | If current temperature is lesser than the set temp, decrease AHU FAN Speed |
| Rule 4: IF occupancyCount > 0 and ambientTemp = SetPoint THEN flowRate = MAX/2 | If the current temp is equal to the required temperature, maintain so |
| Rule 5: IF StartOfWorkingHours − currentTime = 30 THEN flowRate = MAX | Pre-Cooling 30 minutes before the start time |
| Rule 6: IF endOfWorkingHours − currentTime = 30 THEN flowRate = 0 | Stop Cooling 30 minutes after regular working hours is over |

Referring back to FIG. 2, at step 204, the one or more hardware processors (also referred as processors) 106 are configured to verify, using a test case generation framework, the received plurality of rules comprising one or more static and dynamic variables of the one or more operations to identify one or more rule sets having conflicting conditions. In an embodiment, the conflicting condition refers to a condition when two or more rules activate the devices in a contradictory manner at the same time. In an embodiment, each rule set from the identified one or more rule sets having conflicting conditions may comprise two rules or more than two rules. Identification of conflicting condition in the rules may lead to variation in values of the one or more static variables which further results in setting flow rate of the air of an HVAC system to different values. The effect of variation in values of the one or more static variables due to identified conflicting conditions which results in setting flow rate of the air of an HVAC system to different values is explained by way of a non-limiting example. In the non-limiting example, a room comfort air temperature set-point is met through either an AHU supply fan or variable-air-volume sub-systems. In both these sub-systems the flow rate of the supply air into the room is modulated to meet a pre-defined set-point. Normally, the room air temperature is used as proxy for thermal comfort, although other factor such as humidity, local air velocity, mean radiant temperature and occupant related parameter may be important. These factors may cause an error between the room temperature and the pre-defined set-point. A base controller is usually a Proportional-Integrated-Derivative (PID) type that tries to minimize the error between the room temperature and the pre-defined set-point, within some dead-band, selected based on recommendations from standards such as American Society of Heating, Refrigerating and Air Conditioning Engineers (ASHRAE) standard 55 for occupant thermal comfort. It may be noted that ASHRAE recommends cooling and heating operative temperature set-points in the range 23-26 degree Celsius and 20-24 degree Celsius respectively. It would be appreciated that each AHU has a dedicated and independent controller that tries to match the return air temperature (RAT) with the set point. The controller generally has a dead-band around the set-point, typically plus-minus one degree Celsius. A user defined rules layer sits on the top of this PID controller such that when none of the rules is firing, the PID controller modulates the flow rate. It would be noted that the rules having frequent conflicting conditions lead to cycling of the AHU supply fan flow rate and thus increase in power consumption. Although, the occupant comfort is still within the acceptable range, the oscillatory behavior led to an overall increase in the electrical consumption. Hence, the frequent cycling of the supply fan defeats the purpose of the PID controller which otherwise give smooth operating profile and may give rise to the AHU fan stability issues requiring frequent maintenance.

In an embodiment, the test case generation framework, used for verifying the plurality of rules, converts the plurality of the rules in a form of an Expressive Decision Table (EDT) which reflects a user friendly tabular notation to formally specify requirement of at least one sub-system. Further, it is used to express one or more requirements in a form of inputs and outputs. It provides a uniform notation to specify both state based and sequence based one or more requirements. Further herein, the test case generation framework in the tabular notation can combine formal semantic and user friendliness. It could be easier to edit when compared with textual, graphical or logical notations especially for specifying sate based requirements. The syntax and semantics of the test case generation framework is designed with active feedback from testers so that the end specification is compact and close to informal requirements. In addition to generating test cases the test case generation framework also generates input variables in real time patterns.

In an embodiment, the conflicting condition among rules may arise when, for a certain set/sequence of inputs in a test case, different requirements lead to different values of output at same time. Referring table 3 as an example, showing a generated test case, wherein conflicting condition is raised at time 2. Here, expressive decision table (EDT) is illustrated through partial requirements of an Air conditioner module, which are described as rules below:
Rule 1: Every minute, Current time (1439) is incremented by 1 and Return Air temperature (RAT) is calculated through a function calcRAT( ).
Rule 2: If occupancy count (OpCnt) is >0 and RAT is <desired temperature (desTemp), set Flowrate to MAX.
Rule 3: If OpCnt is <10, set Flowrate to Zero.

TABLE 2

| SNO | In OpCnt | RAT | CurrTime | Out CurrTime | RAT | FlowRate |
|---|---|---|---|---|---|---|
| 1 | | | <1439 (=60 s) | CurrTime + 1 | calcRAT ( ) | |
| 2 | >0 | >desTemp | | | Off | MAX |
| 3 | <10 | | | | | 0 |

Table 2 specifies the above requirements using EDT, in which each row maps directly to one of the requirements. The column headers specify three input signals: OpCnt, RAT and CurrTime, and three output signals: CurrTime, RAT and Flowrate. It is noted that CurrTime and RAT occurs in both input and output signals, thus called local or I/O signals. All input cells are connected through Logical pattern expressions where pattern expressions in each input cell specify the input value(s) that will match the requirements of that cell.

TABLE 3

| Time (MIN) | Input Signals | Output Signals | Remarks |
|---|---|---|---|
| 0 | OpCnt = 0 | | |
| 1 | OpCnt = 20 | | |
| | | CurrTime = 1 | Row 1 output |
| | | RTE = 25 | Row 1 output |
| | | FlowRate = MAX | Row 3 output |
| 2 | OpCnt = 5 | | |
| | | CurrTime = 2 | Row 1 output |
| | | RTE = 24.5 | Row 1 output |
| | | FlowRate = MAX | Row 2 output |
| | | FlowRate = 0 | Row 3 output |

As can be seen from Table 3, for the default values of desired temperature and occupancy count assumed to be 22 and 0 respectively, the return air temperature (RTE) is calculated by the function calcRAT( ) when row 1 of Table 2 matches. At time 2, value of occupancy count (OpCnt) is 5 that matches both rows 2 and 3 of Table 2. Also RTE is calculated as 24.5, which is less than desired temperature. Second input of row 3 of Table 2 also matches. Since all inputs of rows 2 and 3 of Table 2 matches, both rows generate different outputs at the same time, thus the conflicting condition is identified. In another embodiment, the rule sets having conflicting conditions are identified when more than one rules are fired at the same time and that may lead to set the flow rate variable to different values. For example, a subset of rules fired at the same time are shown below.
R1: If Occupancy Count(OC)=0 for 2 hours, set flow rate to zero.
R2: If Return Air Temperature(RAT) is >Threshold3&&<=Threshold2 and current time is either <START_TIME or >END_TIME, set flow rate to five.
R3: If RAT is >desired_temperature (DS)+TEMP_TOLERANCE, set flow rate to 10.
R4: If occupancy count>0 and ambient temp (AT)>RAT, set flow rate to 20.
R5: If RAT<DS and OC>0, set the flow rate to 5.
In this case, a test case is considered with some input conditions, wherein input conditions refer to some value of all inputs that are mentioned in rules in EDT that will lead to matching of one or more rules. A sample input condition at a particular time is assumed to be having ambient temperature=27, return air temperature=25, occupancy count=10, desired temp=24. These conditions will satisfy rule 4 and rule 5 fired at same time setting flow rate to values 20 and 5 respectively. Thus, rule set (R4, R5) is identified as a rule set having conflicting condition. In a similar way, other rule sets having conflicting conditions are identified.

Figure 3:
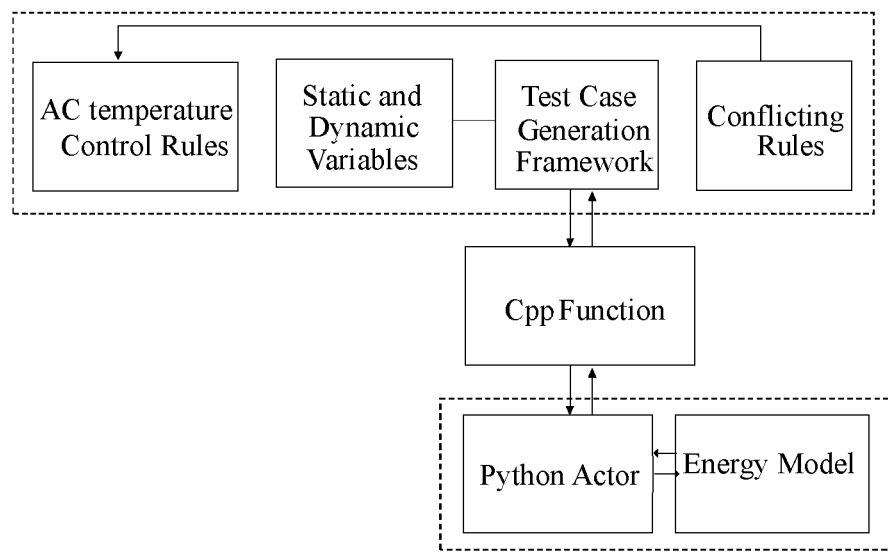
FIG. 3 illustrate a high level architecture of an integrated framework in the system for optimizing performance parameters of air handling units in infrastructures, according to some embodiments of the present disclosure.

Further, as depicted in FIG. 2, at step 206, the one or more hardware processors (106) are configured to determine, frequency of the one or more rule sets having conflicting conditions using an integrated framework during different runs. For example, for a simulation run for total 10 times, if a rule set (say R1, R2 R3 and R4) having conflicting conditions is identified for run 1, run 6 and run 8 respectively, then the frequency of the rule set (R1, R2 R3 and R4) is determined to be as three. In an embodiment, the test case generation framework is integrated with a building energy model using a co-simulation paradigm. The integrated framework allows for coupling different simulation programs for co-simulation and couple simulation programs with actual hardware. Referring to FIG. 3, a high level architecture of integrated framework in the system is depicted for optimizing performance parameters of AHUs in infrastructures, as an example, wherein a Building Controls Virtual Test Bed (BCVTB) framework for the building energy model is shown, which helps in integrating the building energy model with various software and simulating the full integration. Python has a package that has APIs for integrating with building energy model via BCVTB. The test case generation framework does not allow to directly call Python functions. Therefore, integration of the test case generation framework with Python is arranged with function CalcRAT which was called by the test case generation framework. Further, the test case generation framework generates the variables occupancy count and ambient temperature and estimates the value of flow rate according to rules using the return air temperature given by the building energy model. The return air temperature is calculated by the building energy model based on the value of these three variables (e.g., occupancy count, ambient temperature and estimated value of flow rate) and previous value of return air temperature. So, there is a continuous loop of interaction between the test case generation framework and the building energy model. Since both the test case generation framework and the building energy model are running independently, totally unaware of each other, passing correct variables at correct time to both is very critical to achieve mutual exclusion.

In an example described in conjunction with Table 4, test case1 (TC1) is generated by executing one test case generation framework as expressive decision table 1 (EDT1) and test case2 (TC2) is generated by executing another test case generation framework as expressive decision table 2 (EDT2). In the TC1, there are two variables that are conflicting namely O1 and O2. In the O1 conflict, three rows (1, 2, and 3) are conflicting. Since the EDT1 processes the last value in case of conflict, the final value of O1 is 10 in the TC1 (generated by row 3). Further, the row 4 of the TC1 is matched by the value of B and O2 and its value is generated as 50. Based on the O1, the next row that matches is row 6 of the TC1 which generates O2 equal to 60. Thus, the conflict occurs in O2 for row pair {4.6} and value of O2 is 60.

It can be seen that there are three pairs of row causing conflicts for O1 that can be flipped such as {1, 2}, {2, 3}, and {1, 3} respectively. Usually, a pair is selected based on frequency of its occurring in the test cases. Herein, it shows only three pairs and all are different, so a random pair is selected i.e., for example {2, 3}. Further, once, the sequence of the rows are flipped the test case2 is obtained. In the EDT2, row 2 of EDT1 becomes row 3 and when executed for the same inputs, output is getting changed. Similarly, by changing value of O1, the value of O2 will change accordingly.

TABLE 4

| S. No. | Inputs | | | Outputs | |
|---|---|---|---|---|---|
| | A | B | O1 | O2 | O1 |
| Expressive Decision Table 1 (EDT1) | | | | | |
| 1 | >0 | | | | 0 |
| 2 | >5 | | | | 5 |
| 3 | >10 | | | | 10 |
| 4 | | 0 | | 50 | |
| 5 | | | 5 | O1 + 50 | |
| 6 | | | 10 | O1 + 50 | |
| Expressive Decision Table 2 (EDT2) | | | | | |
| 1 | >0 | | | | 0 |
| 2 | >10 | | | | 10 |
| 3 | >5 | | | | 5 |
| 4 | | 0 | | 50 | |
| 5 | | | 5 | O1 + 50 | |
| 6 | | | 10 | O1 + 50 | |

| Time | Inputs | Outputs | Row matched |
|---|---|---|---|
| Test case 1 (TC1) | | | |
| 0 | B = 0 | | |
| 0 | A = 15 | | |
| | | O1 = 0 | 1 |
| | | O1 = 5 | 2 |
| | | O1 = 10 | 3 |
| | | O2 = 50 | 4 |
| | | O2 = 60 | 6 |

TABLE 4-continued

| Test case 2 (TC2) | | | |
|---|---|---|---|
| 0 | B = 0 | | |
| 0 | A = 15 | | |
| | | O1 = 0 | 1 |
| | | O1 = 10 | 2 |
| | | O1 = 5 | 3 |
| | | O2 = 50 | 4 |
| | | O2 = 55 | 5 |

In another embodiment, wherein the test case generation framework generates the variables occupancy count and ambient temperature and estimates the value of flow rate according to the rules using the return air temperature given by energy model. The return air temperature is calculated by the building energy model based on the value of these three variables and previous value of return air temperature.

In an example, where at any time $t_x$ the building energy model will acquire lock and use the values of variables at time $t_{x-1}$ and compute return air temperature that will be written in a shared memory and passed to the test case generation framework. The test case generation framework will read the values at time $t_x$ which will be used later at time $t_{x+1}$ and release the lock, maintaining write followed by read approach.

Referring back to FIG. 2, at step 208, the one or more hardware processors (106) are configured to generate, a ranked list of the one or more rule sets having conflicting conditions based on the frequency of the one or more rule sets having conflicting conditions. For example, it is assumed that the integrated framework utilizes total 27 rules (R1 to R27) for 90 days with ambient temperature and occupancy count of a building as inputs. In this example, 12 rules per day are considered which are provided in Table 5 and EDT corresponding to these 12 rules is provided in Table 6.

TABLE 5

R1: If Occupancy Count (OC) = 0 for 2 hours set flow rate to zero.
R2: If Return Air Temperature (RAT) is > Threshold3 && <= Threshold2 and current time (CurrTime) is either < START_TIME or > END_TIME set flow rate to five.
R3: If RAT is > desired_temperature + TEMP_TOLERANCE set flow rate to 10.
R4: If RAT is > Threshold2 && <= Threshold1 and current time is between START_TIME to END_TIME set flow rate to 15.
R5: If RAT is < desired_temperature − TEMP_TOLERANCE set flow rate to 10.
R6: If occupancy count > 0 and ambient temp (AT) > RAT set flow rate to 20.
R7: If RAT is > Threshold2 && <= Threshold1 and current time is either < START_TIME or > END_TIME set flow rate to 15.
R8: If motion detection (MD) = 0 for 1 hour set flow rate to zero.
R9: If current time >= END_TIME + 30 set flow rate to 0.
R10: If current time >= START_TIME − 30 set flow rate to 20.
R11: If RAT > DS and OC > 0 set the flow rate to 20.
R12: If RAT < DS and OC > 0 set the flow rate to 5.

TABLE 6

| S.no | IN RAT | OC | MD | AT | CurrTime | OUT Flowrate |
|---|---|---|---|---|---|---|
| 1 | | 0{=2 Hrs} | | | | 0 |
| 2 | >Threshold 3 && <= Threshold 2 | | | | <START_TIME \|\| > END_TIME | 5 |
| 3 | >DS + TEMP_TOLERANCE | | | | | 10 |
| 4 | >Threshold 2 && <= Threshold 1 | | | | [START_TIME . END_TIME] | 15 |
| 5 | <DS − TEMP_TOLERANCE | | | | | 10 |
| 6 | | >0 | | >RAT | | 20 |
| 7 | >Threshold 2 && <= Threshold 1 | | | | <START_TIME \|\| > END_TIME | 15 |
| 8 | | | 0{=1 Hrs} | | | 0 |
| 9 | | | | | END_TIME + 30 | 0 |
| 10 | | | | | START_TIME − 30 | 20 |
| 11 | >DS | >0 | | | | 20 |
| 12 | <DS | >0 | | | | 5 |

Outputs of the 12 rules specified in Table 5 are as provided in Table 7 shown below:

TABLE 7

| Rule set | Rules | Flow rate |
|---|---|---|
| 1 | R1, R8 and R9 | 0 |
| 2 | R2 and R12 | 5 |
| 3 | R3 and R5 | 10 |
| 4 | R4 and R7 | 15 |
| 5 | R10, R11 and R6 | 20 |

Table 8 provides one or more rules sets which are identified as the rule sets having conflicting conditions.

TABLE 8

| Rule set | Rule set | Conflict Frequency score |
|---|---|---|
| 1 | R1, R2, and R3 | 100 |
| 2 | R4 and R5 | 80 |
| 3 | R6, R7, and R8 | 65 |
| 4 | R9 and R10 | 52 |

As can be seen from Table 8, four rule sets are identified as the rules sets having conflicting conditions since the rules in corresponding rule sets are fired at the same time and setting output (e.g., flow rate) to different values. Further, it is depicted in Table 5 that rule set 1 (R1, R2 and R3) conflicts 100 number of times, rule set 2 (R4 and R5) conflicts 80 times, rule set 3 (R6, R7, and R8) conflicts 65 times, and rule set 4 (R9 and R10) conflicts 52 times. So, based on the frequency of occurrence of conflict (alternatively referred as conflict frequency score) among rules in the corresponding rule sets, a ranked list of rules sets having conflicting conditions is generated. An example of the ranked list of the rules sets having conflicting conditions is shown in Table 8.

Further, as depicted in step 210 of FIG. 2, the one or more hardware processors (106) are configured to identify, one or more rules based on a selection of at least one rule set from the ranked list of the one or more rule sets and a performance criteria. In an embodiment, the selection of at least one rule set from the ranked list of the one or more rule sets is based on a highest conflict frequency criteria. In other words, a rule set with highest conflict frequency score is selected from the ranked list of the rules sets having conflicting conditions. For example, as shown in Table 8, rule set 1 (R1, R2, and R3) has the highest conflict frequency score of 100. Thus, rule set 1 is selected from Table 8 showing an example of the ranked list of the rules sets having conflicting conditions. Further, one or more rules are selected from all rules comprised in the selected rule set (e.g., rule set 1). Selection of one or more rules comprised in the selected rule set (e.g., rule set 1) is done based on generation of another ranked list. Another ranked list is generated by providing a ranking score to each rule comprised in the selected rule set (e.g., rule set 1).

TABLE 9

| Rule | Ranking score |
|---|---|
| R2 | 35 |
| R1 | 30 |
| R3 | 25 |

For example, as depicted in Table 9, the ranking score provided to R1 is 30, R2 is 35 and R3 is 25. Thus, R2 is selected from the another ranked list as depicted in Table 9. Here, the ranking score is provided based on a performance criteria, wherein a mapping between each rule comprised in the selected rule set (e.g., rule set 1) is performed with one or more parameters specific to the performance criteria. In an embodiment, the one or more parameters specific to the performance criteria comprises at least one of (i) a consumed energy and (ii) a discomfort level. The rules showing better performance are assigned larger score. Here, the performance criteria for a rule is defined as reduction in the value of consumed energy while maintaining discomfort level of occupants with in a predefined/permissible range for next T steps. Here, the permissible range could be but not limited to 0 to 15. In an embodiment, the ranking score gets updated after each iteration. In each iteration, performance of a selected rule is observed based on the values of consumed energy and discomfort level for X steps after the selected rule is fired. The ranking score is directly proportional to consumed energy and reduction in discomfort level. Based on the number by which the energy and discomfort level increases or decreases, the ranking score is updated. The ranking score of all rules in previous iteration is used in next iteration and also gets updated after the next iteration is over.

In another embodiment, more than one rule sets are selected from the ranked list of the one or more rule sets. In an embodiment, all rule sets from the ranked list of the one or more rule sets could also be selected. Here, some of the selected rules can have high conflict frequency scores, while some other rules can have medium conflict frequency scores and remaining can have low conflict frequency scores. For each rule set, a machine learning mechanism is applied to learn score by making each rule of the selected rule set as the deciding rule on some data set and monitoring the change in energy consumed and discomfort level. Thus, based on monitoring the change in energy consumed and discomfort level, a relative score is provided for each rule in all the rule sets comprised in the ranked list of the one or more rule sets. For example, it is assumed that 2 rule sets (R1, R2 and R3) and (R4 and R5) are selected. Now, based on the performance criteria, the impact of each rule is analyzed when a conflict is there in these data sets. If conflict arise in rule set (R1, R2 and R3), then a rule (R1 or R3 or R3) is selected with some probability and impact of selected rule is measured. This impact of the chosen rule will be measured as a function of energy consumed and discomfort level for next T steps.

In an embodiment, for those rules sets from the identified one or more rule sets that comprise two rules only, a rule flipping mechanism is performed. Rule flipping mechanism refers to a process of changing the sequence of rules in Expressive decision table (EDT) when a conflict occurs. Generally, execution in EDT follows a top-to-bottom (or bottom to top in some scenarios) approach due to which the last rule overwrites the previous rule. However, the rule flipping mechanism proposed in the present disclosure as implemented by the system 100 is modified based on mapping the rules with the performance criteria. In case of a rule set comprising only a pair of rules (two rules only), the rule providing better performance is flipped with another rule irrespective of whether the other rule is last rule which is normally given priority in traditional system. For example, Table 3 depicting execution in Expressive decision table in traditional system shows that last value (output of row 2) overwrites the previous value (output of row 3) for flow rate. Hence, the final value taken for further processing is 0. However, in present disclosure the value of flow rate for row 2 and row 3 are mapped with energy value and discomfort level. Based on mapping, it is analyzed that execution of row 3 provides better performance than row 2. Thus, row 2 and row 3 are interchanged and row 2 of previous EDT (shown in Table 3) becomes row 3 of new EDT (shown in Table 10). It can be seen from Table 10 that the value of flow rate is changed due to rule flipping. The flipped rules are further used for next executions.

TABLE 10

| Time (Min) | Inputs | Outputs | Remarks |
|---|---|---|---|
| 0 | OpCnt = 0 | | |
| 1 | OpCnt = 0 | | |
| | | CurrTime = 2 | Row 1 output |
| | | RAT = 24.5 | Row 1 output |
| | | FlowRate = 0 | Row 3 output |
| | | FlowRate = MAX | Row 2 output |

Further, as depicted in FIG. 2, at step 212, the one or more hardware processors (106) are configured to dynamically optimize, one or more parameters specific to the performance criteria based on the identified one or more rules. The identified one or more rules are the rules having highest ranking score which are dynamically identified, in one example embodiment. Further, ranking of the rules is performed based on mapping with the one or more parameters (in this case, consumed energy and discomfort level) specific to the performance criteria. Thus, based on dynamic identification of rules having high rank from the ranked list of the one or more rule sets, the performance of the system 100 (or AHUs under consideration) and the one or more parameters specific to the performance criteria are dynamically optimized.

Experimental Results

The present disclosure utilizes an experimental set up where experiments are conducted using the BCVTB co-simulation framework on a real-world office setup. A list of all possible rules from a facility HVAC manager is obtained, specifically 27 rules that would set the flow rate to 0, ¼, ½, ¾ or 1 of MAX (rated AHU flow rate). These 27 rules were converted to EDT rows. Further, experiments are performed on a real time data set with an integrated set up of EDT-Tool and the building energy model. The historical logs of the input parameters to EDT framework such as OpCnt and ambientTemp are obtained for 90 days in the form of test cases. Approximately 40 unique conflicts per test case are identified. Also, with the variety in the input profiles, the rules that conflicted varied across time and test case. To analyze the impact of these conflicts, the rule sequences in EDT are flipped for further experiments. The rule pairs conflicting with the highest frequency are selected and flipped for the next execution. Now, the test cases after execution 2 of flipped rules are different from test cases of execution 1 and they had different conflicts, despite having same input values. Again, the rules conflicting the highest number of times for execution two are selected and flipped for next execution. Flipping has been executed for a depth of two.

In an embodiment, the present disclosure utilizes the total consumed energy (kWh) and time-average PPD metric (%) during the occupied hours across the 90 days as comparison metrics. The discomfort level is measured in terms of thermal comfort which is further quantified using Fanger's predicted percentage dissatisfied (PPD) metric. It is noted that PPD<15% is recommended for thermal comfort. It is observed that the thermal comfort of occupants is within the predefined/permissible limits for the entire duration of the working hours (0900-1800 Hours).

Table 11 provides results of the Benchmark set of rules.

TABLE 11

| S. No | Simulation_I | Rules Flipped | Depth | Consumed Energy | Discomfort Level (%) | Energy Change (%) |
|---|---|---|---|---|---|---|
| 1 (Benchmark) | 0 | | 0 | 34670 | 10.4 | |
| 2 | | Decreasing | 0 | 32832 | 17.5 | −5.3 |
| 3 | 1.1 | 1 and 2 | 1 | 32310 | 12.5 | −6.8 |
| 4 | 2.1 | 1 and 3 | 1 | 34669 | 10.4 | ~0 |
| 5 | 3.1 | 4 and 5 | 1 | 43953 | 10.3 | +26.7 |
| 6 | 1.2 | 1 and 3 | 2 | 33537 | 11.4 | −3.3 |
| 7 | 2.2 | 1 and 2 | 2 | 32660 | 12.1 | −5.8 |
| 8 | 3.2 | 4 and 6 | 2 | 34675 | 10.4 | ~0 |

Figure 4:
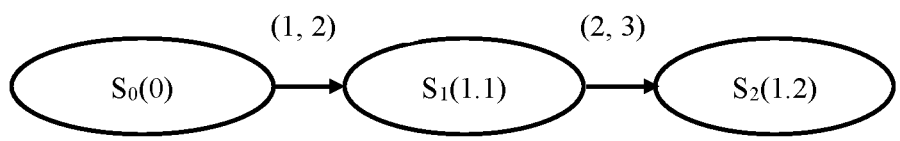
FIG. 4 illustrates a simulation path for rule flipping by picking the conflicting rules with highest frequency to achieve a balance between energy and comfort, according to some embodiments of the present disclosure.

The present disclosure is based on some standard assumptions, wherein first standard assumption is that energy is directly proportional to flow rate and second standard assumption is that occupants discomfort level will decrease when more energy is consumed. Hence simulation was run for the system described in the present disclosure, where flow rate with minimum values is preferred among all conflicting rules for any time instant. This is easily achieved by sorting the rule set in decreasing order of flow rate and feeding to EDT-Tool. Table 11 shows corresponding consumed energy and discomfort level in second simulation. Based on a comparison of proposed disclosure with Benchmark set of rules, it is observed that the consume energy has dropped by 5.3% while discomfort level has gone up to 17.5% which is not in the preferred range. It holds above stated standard assumptions but at same time, also indicates that trading off between consumed energy and occupants comfort level is a hard problem. In order to achieve a balance between energy and comfort, different paths for rule flipping are opted by picking the conflicting rules with highest frequency. A path is defined as a sequence of directed edges which connect a sequence of simulations (states). These edges will store the pair of rules flipped for a particular transition. The relation between sequences of states have been represented using state identifiers (IDs). FIG. 4 illustrates a simulation path for rule flipping by picking the conflicting rules with highest frequency to achieve a balance between energy and comfort, according to some embodiments of the present disclosure. In FIG. 4, $S_0$, $S_1$ and $S_2$ represent three simulation instances of a path with simulation ID 0, 1.1 and 1.2. $S_1$ was attained by flipping a pair of rules (1, 2) from benchmark. Rules (2, 3) from $S_1$ preference rule list are flipped again to attain $S_2$. Depth of a state is defined as number of edges between the root (Benchmark) and current state. Initially for benchmark simulation, the top three most conflicting pair of rules are chosen one by one and simulation is re-run by giving preference to one rule over other through flipping. Flipping of rules results in three new preference orders for the set of rules. Similarly, simulation for the second depth is executed which means that simulation is executed for new preferred order for rules. While going for third depth flip, it is observed that the new preference orders are already covered in previous simulations. Hence, there is no need to go for third depth of simulation.

Table 12 shows the set of rules flipped during simulations.

TABLE 12

1. IF OpCnt = 0 (>=2 Hrs) and CurrTime < 1440 THEN FlowRate = 0
2. IF RAT > Threshold THEN FlowRate = MAX TABLE 12-continued 3. IF RAT > Threshold and endOfWorkingHours < CurrTime < startOfWorkingHours THEN FlowRate = MAX
4. IF OpCnt > 0 and RAT < ambientTemp THEN FlowRate = MAX
5. IF Threshold4 < RAT <= Threshold3 THEN FlowRate = MAX/4
6. IF OpCnt > 0 and RAT < desTemp THEN FlowRate = MAX/4

Coverage of all rules through EDT for the above simulations are also measured. For the benchmark preference rule list, it is found that one rule (e.g., "If RAT is [22.23], set flow rate to 0") is not covered throughout the 90 days. It is also observed that attempting the coverage of this rule by generating test cases purely through EDT is also not successful, indicating that there may be some ambiguous rule priority that is responsible for the lack of coverage. The execution details are analyzed to gain insight of the reason for uncoverability. It is observed that three of the rules are trying to maintain RAT around 24 with a moderate flow rate of 5 while rule 4 in Table 12 is trying to set flow rate to MAX. Since priority of rule 4 is lower than at least one of these three rules, resultant flow rate is always 5 in case RAT become 24. So, RAT never drops below 23. Hence, when priority of rule four is set higher than said three rules, it results in positive rate of decrease in RAT leading RAT to drop below 23 and finally covering the rule in simulation 5. In Table 11, the impact of conflicts on consumed energy and discomfort level is shown. Due to the flips, comfort temperature and consumed energy of the system changed substantially. In simulation two, it is observed that approximately 6.8% reduction in consumed energy while discomfort level went up by 2.1% when compared with the benchmark. Further, for simulation five, it is observed that consumed energy goes up by 26% while discomfort level is approximately same. Thus, the best trade-off between energy and occupants comfort is achieved for simulation three.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
receiving, via one or more hardware processors, a plurality of rules comprising one or more static and dynamic variables of one or more operations of at least one subsystem;
verifying and converting the received plurality of rules comprising one or more static and dynamic variables of the one or more operations in a form of an Expressive Decision Table (EDT) to identify one or more rule sets having conflicting conditions, wherein the conflicting conditions refer to a condition when two or more rules activate a device in a contradictory manner simultaneously;
determining frequency of the one or more rule sets having conflicting conditions;
generating, based on the frequency of the one or more rule sets having conflicting conditions, a ranked list of the one or more rule sets having conflicting conditions;
identifying, one or more rules based on a selection of at least one rule set from the ranked list of the one or more rule sets and a performance criteria; and
dynamically optimizing, one or more parameters of Air Handling Units (AHU) specific to the performance criteria, wherein the one or more parameters including at least one of a consumed energy, a discomfort level based on the identified one or more rules, wherein the identified one or more rule sets having only a pair of rules initiates performing of flipping to change sequence of rules in the EDT, wherein the flipping is modified based on mapping the rules with the performance criteria, wherein the flipping achieves a balance between the consumed energy and comfort by selecting conflicting rules with highest frequency.

2. The method of claim 1, wherein the selection of at least one rule set from the ranked list of the one or more rule sets is based on a highest conflict frequency criteria.

3. A system, comprising:
a memory;
one or more communication interfaces; and
one or more hardware processors coupled to said memory through said one or more communication interfaces, wherein said one or more hardware processors are configured to:
receive, via one or more hardware processors, a plurality of rules comprising one or more static and dynamic variables of one or more operations of at least one subsystem;
verify and convert the received plurality of rules comprising one or more static and dynamic variables of the one or more operations in a form of an Expressive Decision Table (EDT) to identify one or more rule sets having conflicting conditions, wherein the conflicting conditions refer to a condition when two or more rules activate a device in a contradictory manner at a same time;
determine frequency of the one or more rule sets having conflicting conditions;
generate, based on the frequency of the one or more rule sets having conflicting conditions, a ranked list of the one or more rule sets having conflicting conditions;

identify, one or more rules based on a selection of at least one rule set from the ranked list of the one or more rule sets and a performance criteria; and dynamically optimize, one or more parameters of Air Handling Units (AHU) specific to the performance criteria, wherein the one or more parameters including at least one of a consumed energy, a discomfort level based on the identified one or more rules, wherein the identified one or more rule sets having only a pair of rules initiates performing flipping to change sequence of rules in the EDT, wherein the flipping is modified based on mapping the rules with the performance criteria, and wherein the flipping achieves a balance between the consumed energy and comfort by selecting conflicting rules with highest frequency.

4. The system of claim 3, wherein the selection of at least one rule set from the ranked list of the one or more rule sets is based on a highest conflict frequency criteria.

5. One or more non-transitory machine readable information storage mediums comprising one or more instructions which when executed by one or more hardware processors cause:

receiving, via one or more hardware processors, a plurality of rules comprising one or more static and dynamic variables of one or more operations of at least one subsystem;

verifying and converting the received plurality of rules comprising one or more static and dynamic variables of the one or more operations in a form of an Expressive Decision Table (EDT) to identify one or more rule sets having conflicting conditions, wherein the conflicting conditions refer to a condition when two or more rules activate a device in a contradictory manner at a same time;

determining frequency of the one or more rule sets having conflicting conditions;

generating, based on the frequency of the one or more rule sets having conflicting conditions, a ranked list of the one or more rule sets having conflicting conditions;

identifying, one or more rules based on a selection of at least one rule set from the ranked list of the one or more rule sets and a performance criteria; and dynamically optimizing, one or more parameters of Air Handling Units (AHU) specific to the performance criteria, wherein the one or more parameters including at least one of a consumed energy, a discomfort level based on the identified one or more rules, wherein the identified one or more rule sets having only a pair of rules initiates performing flipping to change sequence of rules in the EDT, wherein the flipping is modified based on mapping the rules with the performance criteria, and wherein the flipping achieves a balance between the consumed energy and comfort by selecting conflicting rules with highest frequency.

6. The one or more non-transitory machine readable information storage mediums of claim 5, wherein the selection of at least one rule set from the ranked list of the one or more rule sets is based on a highest conflict frequency criteria.

* * * * *